Nov. 5, 1929.　　　J. M. McCLATCHIE　　　1,734,389
PRESSURE REGULATOR FOR HOMOGENIZING DEVICES
Filed March 21, 1928　　2 Sheets-Sheet 1
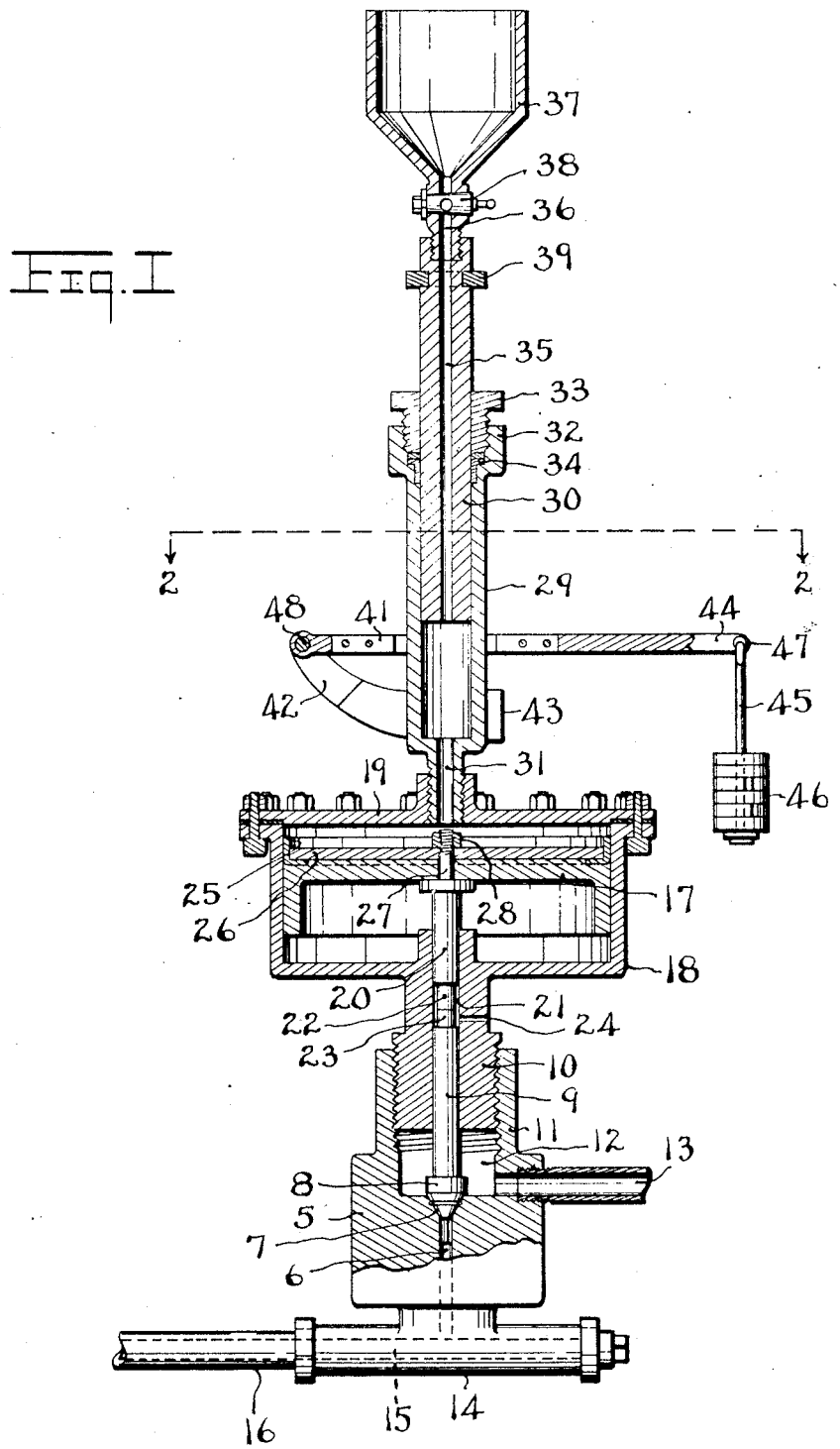

Nov. 5, 1929.   J. M. McCLATCHIE   1,734,389
PRESSURE REGULATOR FOR HOMOGENIZING DEVICES
Filed March 21, 1928   2 Sheets-Sheet 2
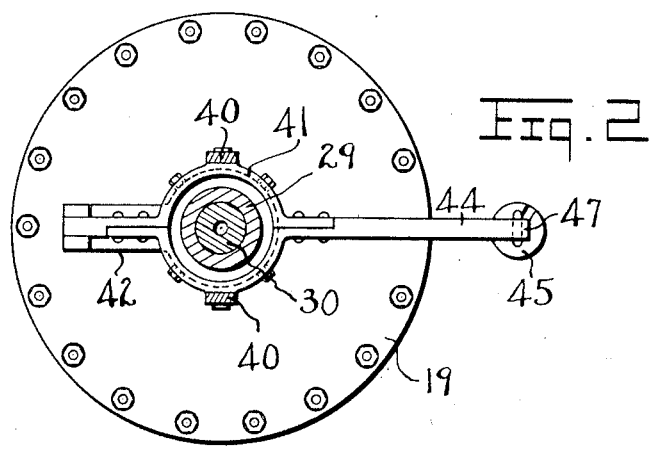
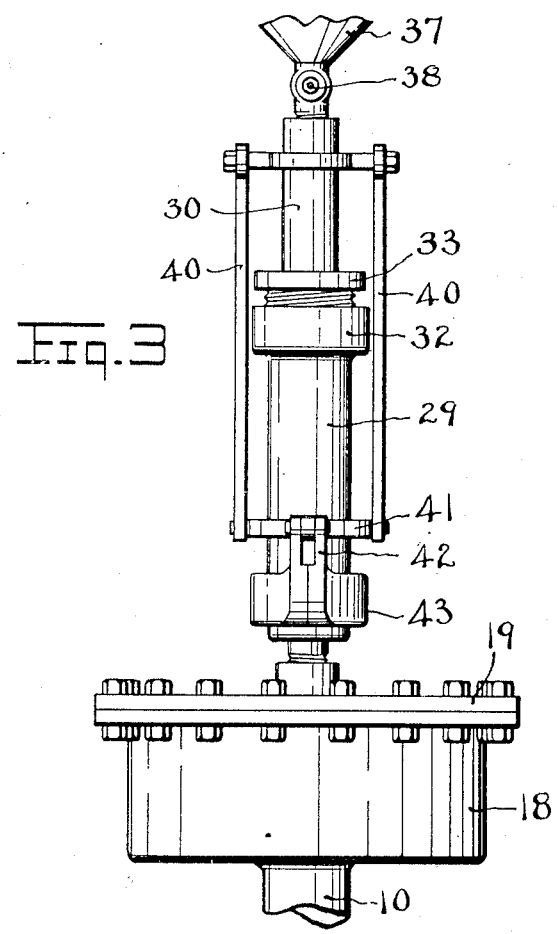
INVENTOR
BY John M. McClatchie
Archibald Cox
ATTORNEY Patented Nov. 5, 1929

1,734,389

UNITED STATES PATENT OFFICE

JOHN M. McCLATCHIE, OF NEW YORK, N. Y., ASSIGNOR TO THE BORDEN COMPANY, OF NEW YORK, N. Y., A CORPORATION OF NEW JERSEY

PRESSURE REGULATOR FOR HOMOGENIZING DEVICES

Application filed March 21, 1928. Serial No. 263,338.

The invention relates to an improvement in pressure regulators for homogenizing devices.

One of the steps in manufacturing evaporated milk is to force the milk under great pressure, after it has been evaporated to the desired density, through a narrow aperture formed by two adjacent plane surfaces which may be stationary disks, or disks revolving in opposite directions or an annular tapered valve seat and a tapered plug coacting therewith. This is done to break up the globules of butter fat to prevent their rising and separating from the rest of the milk when the evaporated milk has been canned. It has been found that not only must the milk be forced through a relatively small aperture but also that it must be forced through the aperture at a high velocity to produce the required homogenizing effect upon the milk. In those cases where the homogenizing device includes an annular tapered valve seat and a coacting tapered plug it has been customary to hold the tapered plug at a fixed, predetermined distance from the annular seat. The kind of pump usually employed for forcing the milk through the homogenizing valve is of the triplex type, or a multiple thereof, in order to impart to the milk passing through the valve a substantially constant pressure so that a substantially constant volume of milk will flow through the valve with uniform velocity and thereby effect the proper homogenizing action on the milk by breaking up all the butter fat globules. Sometimes, however, one or more of the parts of the pump will get out of order with the result that the volume of milk delivered by the pump will vary. As the volume decreases, the pressure and velocity of the milk passing through the valve decrease and hence the globules of butter fat are insufficiently broken up. For this and other reasons it has frequently been found necessary to pass the milk through the homogenizing valve two or more times in order to assure the complete breaking up of the butter fat globules.

The object of the present invention is to produce a pressure regulating mechanism for homogenizing devices which will have the effect of causing the milk to be forced through the homogenizing device at a constant and uniform pressure and therefore at a uniform velocity, with the result that all the milk passing through the valve will have the same homogenizing effect imparted to it. To this end the invention consists of improved means for exerting a constant and uniform force on the movable part of the valve, preferably the tapered plug, so that the milk will be forced through the valve at a substantially constant pressure and consequently at a substantially constant velocity. In this arrangement, if for any reason the volume of milk delivered by the pump should vary, the improved pressure regulating mechanism will automatically adjust the valve to compensate for the abnormal condition of the pump. If the volume of milk delivered by the pump should fall off the force acting on the tapered plug will automatically decrease the aperture between it and the valve seat, whereby the decreased volume of milk will be caused to be forced through the valve at the same pressure and velocity as the normal volume of milk delivered by the pump. And conversely, if by reason of the pump speeding up beyond normal, a greater volume of milk should be delivered, the force acting on the tapered plug will automatically permit the aperture between it and the valve seat to widen to accommodate the increased volume while maintaining it under constant pressure. The improved pressure regulating mechanism is more fully described hereinafter and more particularly pointed out in the appended claims.

The preferred form of the invention is illustrated in the accompanying drawings in which Fig. 1 is a vertical section through the improved pressure regulator and showing in sectional elevation the homogenizing device to which it is applied; Fig. 2 is a section taken on the line 2—2 of Fig. 1; and Fig. 3 is a side elevation of a part of the pressure regulator as seen from the left in Fig. 1.

The homogenizing device to which the improved pressure regulator of the present invention is adapted to be applied may be of any usual construction. The homogenizing device shown in the drawings comprises an upright cylindrical casing 5 having an axial bore 6 in the upper part of which is formed an annular tapered valve seat 7. A tapered movable valve member or plug 8 is adapted to seat against the valve seat 7 and is engaged by the lower end of a stem 9 slidingly fitted in the part 10 which is provided with an external thread to screw into the upper part 11 of the valve casing 5. The bore 6 discharges at its upper end into the valve chamber 12 which in turn discharges through the outlet pipe 13. The attachment 14 secured to the lower end of the casing 5 is provided with a longitudinal bore 15 with which communicates the inlet pipe 16 leading from the high pressure pump which forces the milk or other fluid through the homogenizing device. The pressure regulator of the present invention acts to exert a constant and uniform pressure on the movable valve member 8 to assure a uniform pressure and velocity in the flow of milk between the valve members.

The improved pressure regulator comprises a piston 17 mounted in a cylinder 18 supported at its lower end on the part 10. The upper end of the cylinder is closed by the cover 19. The piston 17 is provided with a downwardly extending rod 20 slidingly received within a central bore 21 in the part 10. The lower end 22 of the piston rod 20 is reduced in diameter and bears against the upper reduced end 23 of the valve stem 9. A vent 24 is formed in the part 10 opposite the reduced portion 23 of the valve stem 9. A tight joint is established between the piston 17 and the interior surface of the cylinder 18 by the cup packing 25 held in place on the piston by the plate 26 secured to the upwardly projecting part 27 of the piston rod by the nut 28.

Located above the cylinder 18 is a second cylinder 29 which is contracted at its lower end and screws into a central boss in the cylinder cover 19. The cylinder 29 is greatly elongated but has only about 1/40 the cross-sectional area of the cylinder 18. The contracted lower end of the cylinder 29 is provided with a conduit 31 through which the interior of the lower part of the cylinder 29 communicates with the interior of the upper part of the cylinder 18 above the piston 17. The upper end 32 of the cylinder 29 is enlarged to receive the gland 33 which acts to compress the packing 34 to establish a tight joint between the piston 30 and the interior of the upper end of the cylinder 29 to prevent leakage. The piston 30 is provided with an axial bore 35 and into the upper end of the piston is screwed the nozzle 36 of an oil reservoir 37. The nozzle 36 is provided with the valve 38. By turning the valve 38 to open position oil from the reservoir 37 is permitted to flow down through the bore 35 of the piston 30 into the lower part of the cylinder 29 and into the upper part of the cylinder 18. Any leakage of oil past the packing 25 has egress through the vent 24. Since the area of the cylinder 29 relatively to the area of the cylinder 18 is about 1 to 40, the force exerted on the upper surface of the piston 17 by the oil in the upper part of the cylinder 18 is about forty times the force exerted on the oil in the lower part of the cylinder 29 by the piston 30.

The means for exerting pressure downwardly upon the piston 30 comprises a yoke 39, the central part of which is received in a groove of the upper part of the piston 30. The outer ends of the yoke 39 are pivotally connected with the upper ends of the two vertically arranged links 40 the lower ends of which are pivotally connected with a bifurcated yoke 41 which surrounds the lower end of the cylinder 29. At one end the yoke 41 is fulcrumed in the upper ends of the bracket arms 42, the lower ends 43 of which embrace the lower end of the cylinder 29. On the free other end 44 of the yoke 41 is suspended a weight carrier 45 adapted to hold the weights 46.

When it has been determined how much force is to be exerted on the valve member 8 and against the milk passing through the valve the appropriate weights 46 are placed on the carrier 45. The distance from the point 47 (at which the weight carrier 45 is suspended on the end 44 of the yoke 41) to the fulcrum point 48 is about three times the distance from the point or pivotal connection between the yoke 41 and the links 40 to the fulcrum point 48. Hence the effective force exerted on the piston 30 by the weights 46 is multiplied by three. Accordingly, if it is desired that a force of 2,000 pounds be applied to the valve member 8 weight 46 totalling 16.6 pounds will be mounted on the carrier 45.

It will be understood from the above description that the force exerted on the valve member 8 will be constant at all times irrespective of how far the member 8 is separated from its seat by the volume of milk passing through the valve. Hence the milk will pass through the valve at substantially constant pressure and at a substantially constant velocity, and consequently the same homogenizing effect will be imparted to all the milk passing through the valve.

Having thus described the invention what I claim as new is:—

1. In a homogenizing device of the character described having a fixed valve member and a movable valve member, means for exerting force on the movable valve member to move it toward the fixed valve member comprising a relatively large piston bearing against the movable valve member and movable in a direction to force the movable valve member against the fixed valve member, a cylinder in which the piston is mounted, a relatively small piston, a cylinder in which the second piston is mounted communicating at one end with the first cylinder, means for admitting fluid into the second cylinder and into the first cylinder, and means for exerting force on the second piston to put the fluid in the first cylinder under pressure to cause the first piston to exert force on the movable valve member.

2. In a homogenizing device of the character described having a fixed valve member and a movable valve member comprising a piston having a part in engagement with the movable valve member and movable in a direction to force the movable valve member against the fixed valve member, a cylinder in which the piston is mounted, means for introducing fluid into the cylinder, and means for putting the fluid in the cylinder under pressure to move the piston in the direction to force the movable valve member against the fixed valve member.

3. In a homogenizing device of the character described having a fixed valve member and a movable valve member, means for exerting force on the movable valve member to close it against the fixed valve member comprising a relatively large piston having a part in engagement with the movable valve member, a cylinder in which the piston is mounted, a relatively small cylinder having communication at its inner end with the outer end of the first cylinder, a piston mounted in the second cylinder, said second piston having an axial bore to admit fluid into the inner end of the second piston and thence into the outer end of the first cylinder, means for supplying fluid into the axial bore of the second piston, and means for exerting force on the second piston to put the fluid in the cylinders under pressure to cause the first piston to exert force on the movable valve member.

4. In a homogenizing device of the character described having a fixed valve member and a movable valve member, means for exerting force on the movable valve member comprising a piston having a part in engagement with the movable valve member and movable in a direction to force the movable valve member against the fixed valve member, a cylinder in which the piston is mounted, and means for introducing fluid under pressure into the cylinder to cause the piston to exert force on the movable valve member.

5. In a homogenizing device of the character described having a fixed valve member and a movable valve member provided with a vertically arranged valve stem, means for exerting force downwardly upon the upper end of the valve stem comprising a relatively large piston provided with a downwardly extending piston rod resting at its lower end on the upper end of the valve stem, a cylinder in which the piston is mounted, a relatively small piston arranged to move vertically, a cylinder in which the second piston is mounted communicating at its lower end with the upper end of the first cylinder, said second piston having an axial bore, a valve controlled reservoir mounted on the upper end of the second piston adapted to contain fluid for filling the lower end of the second cylinder and the upper end of the first cylinder, and means for exerting force on the second piston to put the fluid in the upper end of the first cylinder under pressure to exert force through the first piston and the piston rod against the movable valve member.

6. In a homogenizing device of the character described having a fixed valve member and a movable valve member provided with a vertically arranged valve stem, means for exerting force downwardly on the valve stem comprising a relatively large piston having a downwardly extending piston rod the lower end of which rests on the upper end of the valve stem, a cylinder in which the piston is mounted, a relatively small piston arranged to move vertically, a cylinder in which the second piston is mounted communicating at its lower end with the upper end of the first cylinder, means for introducing fluid into the lower end of the second cylinder and into the upper end of the first cylinder, a pivotally mounted arm adapted to hold weights at its free end, and connections between the arm and the second piston whereby force exerted downwardly on the arm is communicated through the second piston to the fluid in the lower end of the second cylinder and in the upper end of the first cylinder against the upper end of the first piston to force the movable valve member against the fixed valve member.

7. In a homogenizing device of the character described having two valve members, means for exerting force on one valve member to move it toward the other valve member comprising means for confining fluid, an element interposed between the fluid and the valve member upon which the force is to be exerted, and means for putting the fluid under pressure.

JOHN M. McCLATCHIE.